UNITED STATES PATENT OFFICE.

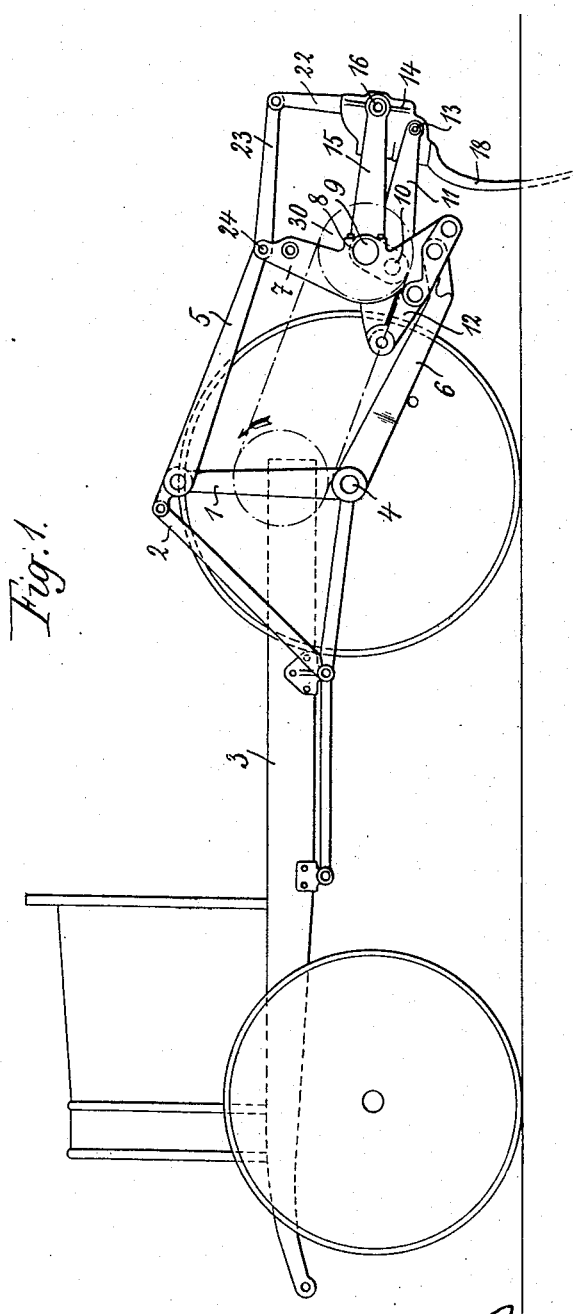

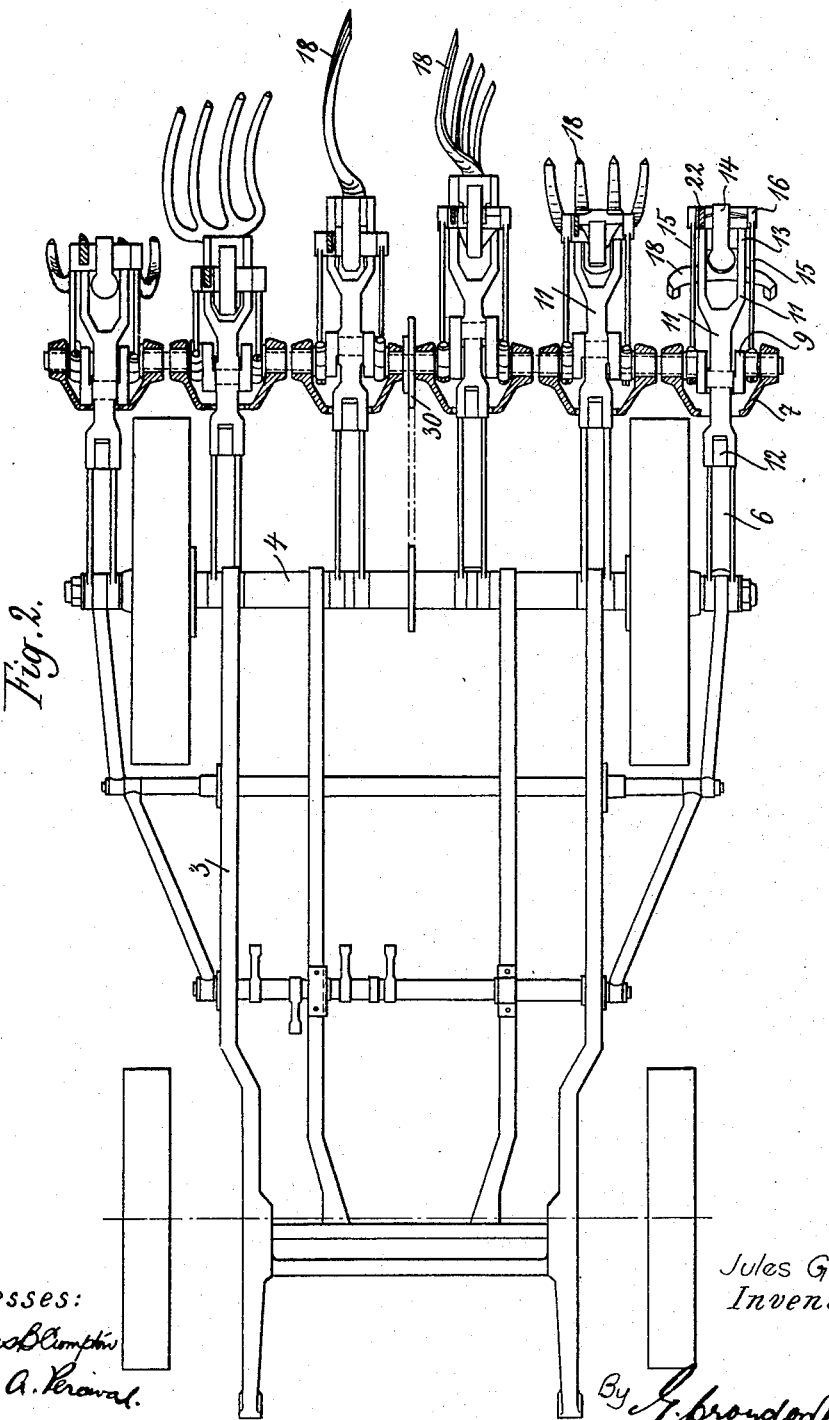

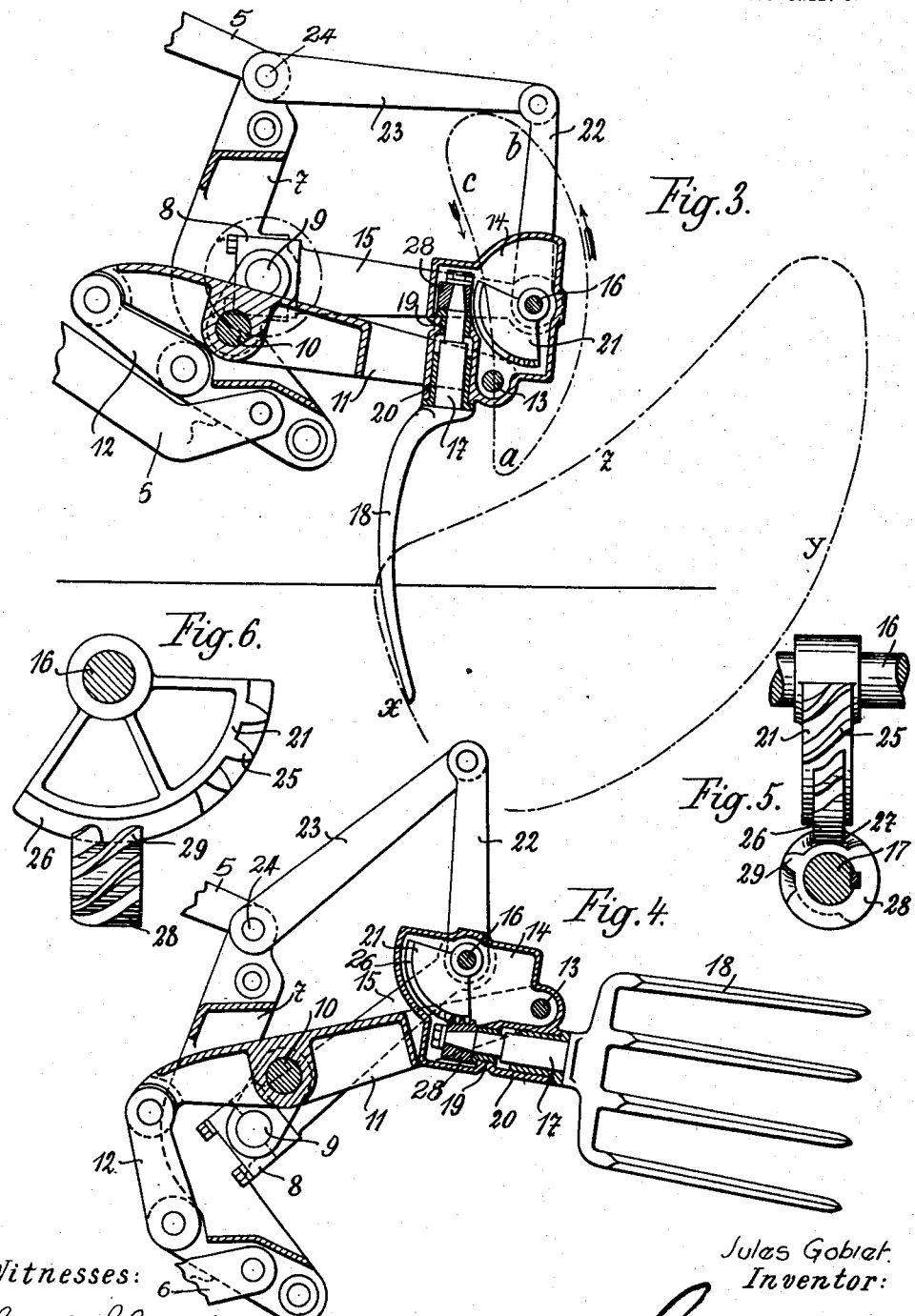

JULES GOBIET, OF VALENTIGNEY, FRANCE.

DIGGING-MACHINE.

1,189,935. Specification of Letters Patent. Patented July 4, 1916.

Application filed August 16, 1913. Serial No. 785,150.

*To all whom it may concern:*

Be it known that I, JULES GOBIET, a citizen of the French Republic, residing at Valentigney, Doubs, France, have invented certain new and useful Improvements in Digging-Machines, of which the following is a specification.

This invention has for its object to provide an improved digging machine for agricultural purposes. The work done by the improved machine is similar to that done by hand, namely a clod of earth being lifted by each of the diggers of the machine and then turned over.

This invention is illustrated by way of example in the accompanying drawings, in which:—

Figure 1 is a side elevation of an improved digging machine, comprising six diggers, of which only the outside left hand digger is shown in the figure. Fig. 2 is a plan of the machine partly in horizontal section taken through the axis of the crank shaft, showing the successive positions of the six diggers. Figs. 3, 4, 5 and 6 are views drawn to a larger scale of certain details of the digging apparatus.

As shown, the digging apparatus of the improved digging machine comprises a frame composed of uprights 1, (Fig. 1) and tie rods 2, mounted on a framing 3 constructed after the manner of an automobile chassis. The uprights 1 which are fixed rigidly to the framing 3, bear at their lower ends upon the hind axle 4. To the upper ends of the uprights 1 there are jointed thrust rods 5. Other thrust rods 6 are jointed to the axle 4. These thrust rods 5 and 6 constitute together with the uprights 1 and the support 7, a jointed parallelogram. This parallelogram is adapted to be raised and lowered by means of a raising mechanism not shown, in such a manner that this raising mechanism acts under one of the thrust rods 5 or 6, so as to leave the support 7 free to move upward.

Near the center of the support 7 there is provided a bearing 8 (Figs. 1, 3 and 4) carrying a crank shaft 9. On the crank pin 10 of this crank shaft there is pivoted a forked part 11 jointed at its forward end to a link 12, and at its rear end by means of an axle 13 to a box 14. The link 12 is jointed at its other end to the support 7. The crank shaft also carries on its axial part the foot of a connecting rod 15, the head of which is jointed to the axle 16 of the box 14. The box 14 serves also as a support for the handle 17 of a digging tool or fork 18. This handle 17 is adapted to turn in the bearings 19 and 20 of the box 14 (Figs. 3 and 4).

The axle 16 has fixed to it a sector 21 (Figs. 3, 4, 5 and 6) adapted to rotate in a semi-cylindrical recess in the box 14. The axle 16 has also fixed to it a lever 22, the other or free end of which is jointed to the head of a link 23, which is jointed in its turn at 24 to the upper part of the support 7, for instance, at the point where the thrust rod 5 is jointed on in its turn to the said support. This construction is, however, not absolutely necessary, and the link 23 may be jointed at any other point. Similarly it is not necessary that the lever 22 shall be exactly equal in length to the distance of the axis of the crank shaft from the axis 24 of the support 7, constituting a jointed parallelogram.

The connecting rod 15 may be made in two parts arranged on either side of the axis of the crank shaft 9 and also of the box 14.

The sector 21 (Figs. 5 and 6) is formed with helical teeth 25 along a portion of its periphery, while the other portion 26 has a less width and is smooth on its periphery. The result of this is that so long as the smooth portion 26 of the sector is engaged in the groove 27 the fork 18 will not turn. The pinion 28 has helical teeth 29 formed upon it on one side of the groove 27, which teeth are adapted to gear with the teeth 25 of the sector, and, as soon as the engagement commences, the digging fork begins to rotate.

Referring to Fig. 5 the relative movement of the sector 21 brings the teeth 25 into contact with the helical teeth 29 of the pinion 28 whereby the axle 17 is partly rotated upon its axis in a clockwise direction. Since the teeth 25 are wider than the smooth portion 26 of the sector, they will at a certain moment (which is determined by the position of the box 14 relatively to the lever 22) engage with the teeth 29 of the pinion 28, and since the groove 27 is slightly offset from the plane of the said pinion the result will be that the digging fork 18 will be caused to rotate.

The operation of the improved apparatus is as follows:—On the crank shaft 9 there is keyed a chain wheel 30 (Fig. 1) or any other suitable gear wheel receiving motion from the motor mounted on the chassis 3. The crank pin 10 of the crank shaft 9, in rotating around the axis of the latter, moves the forked member 11, which bearing upon the link 12 compels the axle 13 to move along the path $a$—$b$—$c$. The axle 16, however, moves in a circular path since the connecting rod 15 revolves around the axis of the crank shaft. From the combination of the path $a$—$b$—$c$ described by the axle 13, with the arc described by the axle 16, the point of the digging fork 18 will be caused to describe the path $x$—$y$—$z$, since the two axles 13 and 16 are mounted in one and the same box 14. At a certain moment of its path, the digging fork will turn on its axis as above described, and then return into its initial position before entering the ground again.

It is to be understood that the length of the lever 22 may be varied in order to allow of adjusting the instant at which the digging fork returns.

If desired, an eccentric fixed in any suitable manner upon the crank shaft may be employed to actuate the foot of the connecting rod 15 for the purpose of varying or increasing the extent of the upsetting movement of the digging forks.

Having now described my invention what I claim as new and desire to secure by Letters Patent is:—

1. A digging machine comprising a vehicle, a plurality of digging tools, a mechanism for driving each digging tool, each mechanism comprising in combination a first jointed parallelogram for determining the depth to which the tool digs, a power driven crank-shaft carried by the said first parallelogram and common to all mechanisms, a handle on the digging tool, a box within which said handle is rotatably mounted, a connecting rod whose foot is carried by the axial part of the said crank-shaft, a first axle mounted in said box and connected to the head of the connecting rod, a lever having one end mounted on the first axle, a link connected at the other end and forming a second parallelogram with said lever, connecting rod and the rear member of the first parallelogram which carries the crank-shaft, a forked member rotatable by the crank-pin, a link connecting between one end of the forked member and a point on the said rear member of the first parallelogram, and a second axle mounted in said box coöperatively engaged by the rear end of the forked member, whereby the box carrying the digging tool has imparted to it a combined movement along a path determined by the paths described by the said first and second axles.

2. A digging machine comprising a vehicle, a plurality of digging tools, a mechanism for driving each digging tool, each mechanism comprising in combination a first jointed parallelogram for determining the depth to which the tool digs, a power driven crank-shaft carried by the said first parallelogram and common to all mechanisms, a handle on the digging tool, a box within which said handle is rotatably mounted, a connecting rod whose foot is carried by the axial part of the said crank-shaft, a first axle mounted in said box and connected to the head of the connecting rod, a lever having one end mounted on the first axle, a link connected at the other end and forming a second parallelogram with said lever, connecting rod and the rear member of the first parallelogram which carries the crank-shaft, a forked member rotatable by the crank-pin, a link connecting between one end of the forked member and a point on the said rear member of the first parallelogram, a second axle mounted in said box and coöperatively engaged by the rear end of the forked member, a sector having helical teeth and a smooth peripheral portion arranged in said box and driven by the first axle, a pinion on the handle of the digging tool having a groove on its periphery and teeth on one side of the groove, the said peripheral portion of sector engaging in said groove, whereby the box has imparted to it a movement along a path determined by the paths described by the said first and second axles while the digging tool is given a rotary motion only at the moment when the smooth portion of the sector has reached the end of its course, and the teeth on the sector and on the pinion engage and thereby rotate the pinion.

In testimony whereof I have affixed my signature in presence of two witnesses.

JULES GOBIET.

Witnesses:
ALBERT PHILLIPE DIAVENSPL,
HANSON C. COXE.